(12) United States Patent
Egard et al.

(10) Patent No.: US 11,493,626 B2
(45) Date of Patent: Nov. 8, 2022

(54) AUTONOMOUS MOBILE ROBOT COMPRISING RADAR SENSORS

(71) Applicant: Acconeer AB, Lund (SE)

(72) Inventors: Mikael Egard, Lund (SE); Hans Grubeck, Tyresö (SE)

(73) Assignee: Acconeer AB

( * ) Notice: Subject to any disclaimer, the term of this patent is extended or adjusted under 35 U.S.C. 154(b) by 635 days.

(21) Appl. No.: 16/483,825

(22) PCT Filed: Feb. 5, 2018

(86) PCT No.: PCT/SE2018/050098
§ 371 (c)(1),
(2) Date: Aug. 6, 2019

(87) PCT Pub. No.: WO2018/143887
PCT Pub. Date: Aug. 9, 2018

(65) Prior Publication Data
US 2020/0096631 A1     Mar. 26, 2020

(30) Foreign Application Priority Data

Feb. 6, 2017 (SE) .................................. 1750101-6

(51) Int. Cl.
*G01S 13/931* (2020.01)
*A01D 34/00* (2006.01)
(Continued)

(52) U.S. Cl.
CPC .......... *G01S 13/931* (2013.01); *A01D 34/008* (2013.01); *A47L 11/4011* (2013.01);
(Continued)

(58) Field of Classification Search
CPC ................. G01S 13/931; G01S 13/878; G01S 2013/93271; G01S 13/003; G01S 13/881;
(Continued)

(56) References Cited

U.S. PATENT DOCUMENTS

2010/0332067 A1   12/2010   Abramson et al.
2013/0218397 A1    8/2013   Griffini et al.
(Continued)

FOREIGN PATENT DOCUMENTS

EP   2939513 A1   11/2015
EP   2960741 A1   12/2015
(Continued)

OTHER PUBLICATIONS

Miller, et al., "Efficient Unbiased Tracking of Multiple Dynamic Obstacles Under Large Viewpoint Changes", IEEE Transactions on Robotics, vol. 27, No. 1, Feb. 2011, Published Nov. 22, 2010; abstract; figure 5, section IV.
(Continued)

*Primary Examiner* — Michael J Zanelli
(74) *Attorney, Agent, or Firm* — Condo Roccia Koptiw LLP

(57) ABSTRACT

According to an aspect of the present inventive concept there is provided an autonomous mobile robot comprising: a set of radar sensors, the sensors being arranged at spatially different positions on the mobile robot, the set including at least a first radar sensor having a first main detection lobe extending in front of the robot and a second radar sensor having a second main detection lobe extending in front of the robot, wherein the first radar sensor and the second radar (Continued)

sensor are arranged such that the first main detection lobe and the second main detection lobe intersect in front of the mobile robot.

22 Claims, 5 Drawing Sheets

(51) Int. Cl.
*A47L 11/40* (2006.01)
*G01S 13/00* (2006.01)
*G05D 1/00* (2006.01)
*G05D 1/02* (2020.01)
*A01D 101/00* (2006.01)

(52) U.S. Cl.
CPC ......... *A47L 11/4061* (2013.01); *G01S 13/003* (2013.01); *G05D 1/0088* (2013.01); *G05D 1/0257* (2013.01); *A01D 2101/00* (2013.01); *A47L 2201/04* (2013.01); *G01S 2013/93271* (2020.01); *G05D 2201/0203* (2013.01); *G05D 2201/0208* (2013.01)

(58) Field of Classification Search
CPC .......... G01S 2013/9327; G05D 1/0257; G05D 2201/0203; G05D 2201/0208; G05D 1/0088; G05D 1/02; A01D 34/008; A01D 2101/00; A01D 34/828; A01D 75/20; B60W 60/0025; B60W 60/001; B60W 2422/00; B25J 9/1676; F16P 3/147
See application file for complete search history.

(56) References Cited

U.S. PATENT DOCUMENTS

| | | |
|---|---|---|
| 2014/0032033 A1 | 1/2014 | Einecke et al. |
| 2014/0191895 A1* | 7/2014 | Binzer ................. G01S 13/878 342/59 |
| 2015/0166060 A1 | 6/2015 | Smith et al. |
| 2016/0116589 A1 | 4/2016 | Fukuman et al. |
| 2017/0001311 A1* | 1/2017 | Bushman .............. A47L 9/2826 |
| 2017/0023943 A1 | 1/2017 | Taira et al. |

FOREIGN PATENT DOCUMENTS

| | | | | |
|---|---|---|---|---|
| JP | 4204086 B2 * | 1/2009 | ............. | G01S 13/48 |
| WO | WO-2007028433 A1 * | 3/2007 | ......... | G01S 13/4445 |
| WO | WO-2017191201 A1 * | 11/2017 | ............. | G01S 13/42 |

OTHER PUBLICATIONS

Ming, et al., "Multisensory fusion and navigation for robot mower", Abstract article, IEEE international Conference on Robotics and Biometrics 2007, (ROBIO 2007), pp. 417-422, Published Dec. 15, 2007.

Mohd, et al., "The Development of a Remote Control Partner Lawnmower Robot", Conference Proceedings Article, 4th Student Conference on Research and Development, 2006, SCOReD 2006, IEEE, Pi, pp. 152-155, published Jan. 1, 2006. Table 1.

Fritsche, et al., "Comparison of Two Radar-based Scanning-techniques for the Use in Robotic Mapping", Institute for Real Time Systems, Leibniz University Hanover, Applestr. 9A, Hanover, Germany., 8 pages.

* cited by examiner

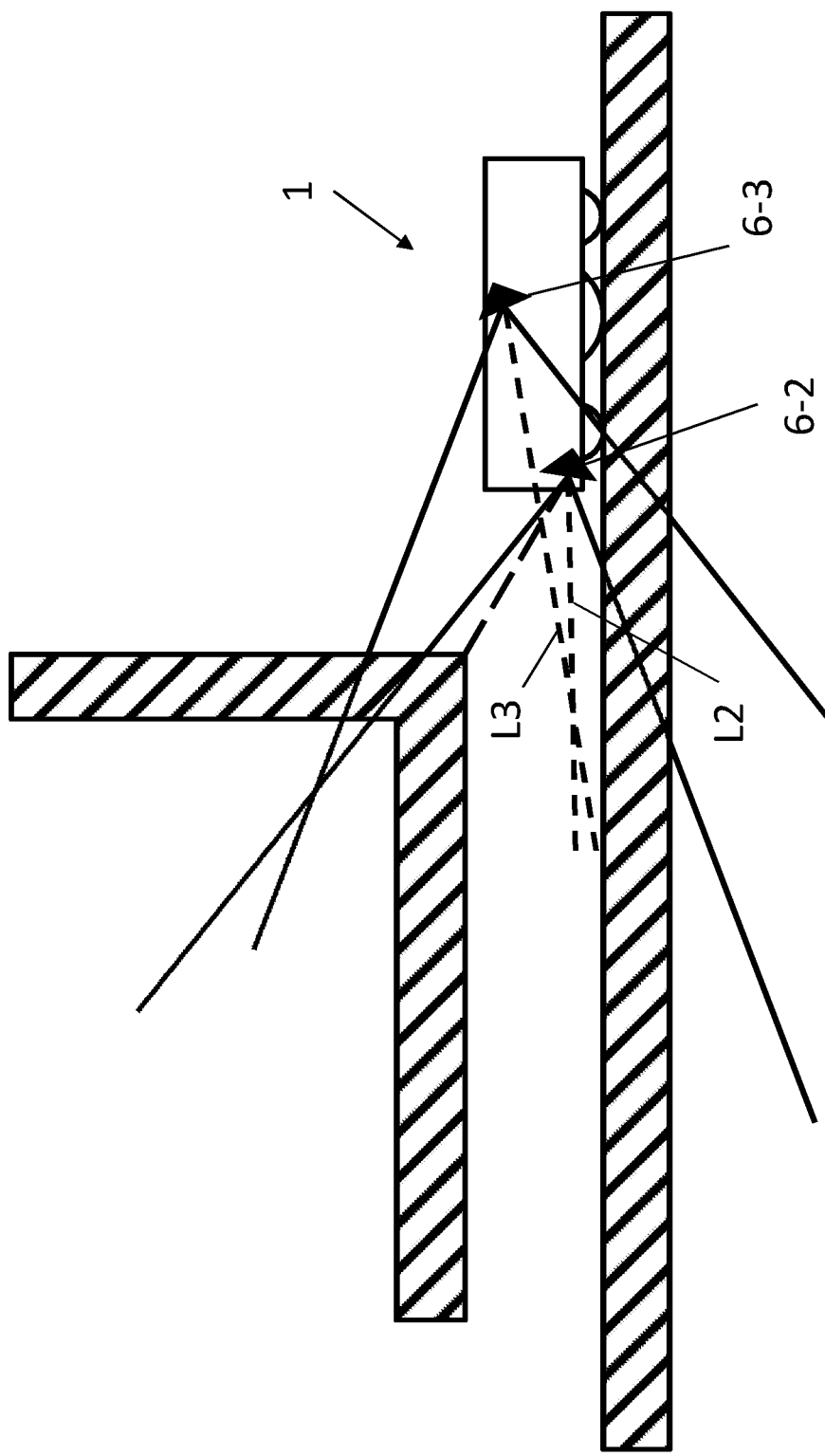

AUTONOMOUS MOBILE ROBOT COMPRISING RADAR SENSORS

CROSS REFERENCE TO RELATED APPLICATIONS

This application is the National Stage Entry under 35 U.S.C. § 371 of Patent Cooperation Treaty Application No. PCT/SE2018/050098, filed Feb. 5, 2018, which claims priority from Swedish Patent Application No. 1750101-6, filed Feb. 6, 2017, which has issued as Swedish Patent No. SE 540 794 C2, the contents of which are hereby incorporated by reference herein.

TECHNICAL FIELD

The present inventive concept relates to an autonomous mobile robot, such as a robot cleaner or a robot lawn mower, comprising a set of radar sensors.

BACKGROUND

Autonomous mobile robots have become ubiquitous and find use in various applications. One popular type of autonomous mobile robots is autonomous robot cleaners, such as vacuum cleaners or sweeping cleaners. Today's robot cleaners often use infrared sensors for detecting and determining positions of obstacles. A narrow infrared beam is transmitted and the reflected beam is measured wherein a position of an obstacle, in relation to the robot cleaner, typically in the form of a radial distance or an angle to an obstacle, may be estimated. A robot cleaner may include several infrared sensors with different aspect angles which together allow determination of a position of an object by triangulation and/or trilateration techniques.

A drawback with infrared sensors in this application is that, due to relatively narrow beam widths, the azimuth angle of operation is quite limited. This may be overcome by rotating an infrared sensor in relation to the robot cleaner and make measurements for several rotational angles, or by providing multiple sensors separated in azimuth angle. These solutions may however lead to increased costs due to moving parts or increased number of sensors. Infrared sensors are also sensitive to incident light from other light sources than the infrared sensors. Moreover, they can be clogged by dust and other debris. The light emitter and light detector of a light sensor also require transparent covers or windows to allow the infrared light to be transmitted. This limits the flexibility with respect to sensor placement on the robot cleaner.

SUMMARY OF THE INVENTIVE CONCEPT

An objective of the present inventive concept is to address at least some of these deficiencies in the prior art. Additional and alternative objectives may be understood from the following.

According to a first aspect of the present inventive concept there is provided an autonomous mobile robot comprising:
a set of radar nodes, said set including:
at least a first radar transmitter, and
at least a first and a second radar receiver being arranged at spatially different positions on the mobile robot, the first radar receiver having a first main detection lobe and the second radar receiver having a second main detection lobe intersecting the first main detection lobe,
wherein the first radar transmitter has a first main transmission lobe covering at least a portion of an intersection between the first and second main detection lobes.

The autonomous mobile robot (for brevity also referred to as "mobile robot") provides a number of advantages:

The set of radar nodes enables detection and position determination of an object, which may form an obstacle in a movement path of the mobile robot, with a comparably high accuracy.

In the present context, determining a position of an object refers to determining a relative position of an object. That is a position of the object in relation to the mobile robot. A (relative) position of the object may be a radial distance between the object and the mobile robot.

Radar nodes are relatively insensitive to light sources.

Radar nodes perform consistently in various conditions, such as in environments where dust or other debris is prevalent.

Radar signals can also penetrate materials which are non-transparent to optical wave lengths. Radar nodes may hence be positioned in a flexible manner on the mobile robot. In particular, one or more of the radar nodes of the set may be arranged inside a body of the mobile robot. The radar nodes may thereby be protected from ambient conditions and collisions with external objects. This may also enable a more rational design and manufacturing process.

The set of radar nodes define a combined or effective detection zone.

The afore-mentioned main lobes, in particular said at least a portion of the intersection, may cover a region or space in front of the mobile robot. This allows the set of radar nodes to facilitate detection of objects in front of the mobile robot, which is a direction in which a mobile robot often may move. Positions of objects may thereby be taken into account for the purpose of determining a movement path of the mobile robot.

Said at least a portion of an intersection herein refers to the intersection between each one of the afore-mentioned main lobes. That is the region or space which is covered by each one of the afore-mentioned main lobes.

As radar node may have a comparably wide main detection lobe, wide angular coverage is possible even with a limited number of radar nodes.

Meanwhile, by the intersection of the main lobes, high accuracy determination of a position of an object located in the portion of the intersection, i.e. the region where the first main transmission lobe, the first main reception lobe and the second main reception lobe overlap, is possible based on at least two reflected radar signals from the object. Hence, multistatic radar operation is enabled wherein data from more than one radar node may be combined.

A wide main detection lobe also enable detection of objects located at a level above the set of radar nodes, in particular at a level above a principal axis of the detection lobe. This may allow the mobile robot to estimate whether sufficient clearance exists under an object, such as a furniture, for the mobile robot to maneuver under the object.

The term "main detection lobe" as used herein refers to the lobe in which a radar node has the highest gain or sensitivity with respect to reflected radar signals.

According to a second aspect of the present inventive concept there is provided an autonomous mobile robot comprising:
a set of radar nodes, said set including:
at least a first radar receiver,
at least a first and a second radar transmitter being arranged at spatially different positions on the mobile robot, the first radar transmitter having a first main transmission lobe and the second radar transmitter having a second main transmission lobe intersecting the first main transmission lobe, wherein the first radar receiver has a first main detection lobe covering at least a portion of an intersection between the first and second main transmission lobes.

The advantages discussed in connection with the first aspect applies correspondingly also to this aspect. Reference is therefore made to the above discussion.

The autonomous mobile robot, in accordance with the first or second aspect, may be an autonomous robot cleaner, such as a robot vacuum cleaner or a robot sweeping cleaner. As robot cleaners frequently need to maneuver in tight spaces, in close proximity to various obstacles, the merits of the present inventive concept are pronounced. The term robot (vacuum or sweeping) cleaner herein refers to an autonomous mobile robot which provide automated cleaning (by vacuuming or sweeping) of a surface in an area, while moving about within said area. As realized by the inventors, the present inventive concept is however also applicable to autonomous mobile robots in general. The term autonomous mobile robot as used herein refers to an automated device arranged to perform an automated task within an area while autonomously moving about in said area.

The autonomous mobile robot may be an autonomous mobile working apparatus. An autonomous mobile working apparatus may perform an automated working task within an area while autonomously moving about in said area, such as treatment or processing of a surface within the area.

The autonomous mobile robot may be an autonomous robot lawn mower. As autonomous robot lawn mowers frequently need to maneuver in tight spaces, in close proximity to various obstacles, the merits of the present inventive concept are pronounced.

By a radar node is hereby meant a radar node including at least a radar receiver or a radar transmitter. A radar node may advantageously include both a radar transmitter and radar receiver.

A radar receiver may be arranged to receive radar signals in a reception beam pattern, the reception beam pattern having a main detection lobe. As used herein, the term main detection lobe (which also may be referred to a main receiving lobe) refers to the detection lobe including the highest power or energy.

A radar node including a radar transmitter may be arranged to transmit radar signals in a transmission beam pattern, the transmission beam pattern having a main transmission lobe. As used herein, the term main transmission lobe refers to the transmission lobe including the highest power or energy.

According to one embodiment of the first aspect, the first main detection lobe and the second main detection lobe are arranged such that a projection, onto a horizontal plane, of a principal axis of the first main detection lobe and a projection, onto said horizontal plane, of a principal axis of the second main detection lobe intersect.

According to one embodiment of the second aspect, the first main transmission lobe and the second main transmission lobe are arranged such that a projection, onto a horizontal plane, of a principal axis of the first main transmission lobe and a projection, onto said horizontal plane, of a principal axis of the second main transmission lobe intersect.

By principal axis of a main detection lobe is hereby meant the central axis of the lobe. The principal axis of a main detection/reception/transmission lobe may also be defined as the direction of maximum gain (for detection/reception/transmission).

By this arrangement, an object position may be determined with an improved accuracy. This may be understood in the context of determining object position by trilateration by considering that the cross-range uncertainty may be reduced compared to an arrangement wherein the detection lobes present an overlap but non-intersecting principle axes (i.e. when projected onto the horizontal plane). Although reference here is made to trilateration, it should be noted that the improved accuracy may be achieved also using other techniques for position determination.

By horizontal plane, is hereby meant a plane being parallel to a plane defined by a width dimension and a length dimension of the mobile robot.

With respect to the first aspect, the first main transmission lobe and the second main detection lobe may be arranged such that a projection, onto a horizontal plane, of a principal axis of the first main transmission lobe and a projection, onto said horizontal plane, of a principal axis of the second main detection lobe intersect.

Alternatively, a projection, onto the horizontal plane, of a principal axis of the first main transmission lobe intersects the principal axis of the first main detection lobe and the principal axis of the second main detection lobe.

These options enable, separately or in combination, an improved accuracy of object position determination to be obtained in the region of intersection of the lobes.

Said projections of the principal axes may intersect at a position, along a line extending from a first (geometrical) end point formed by the first radar receiver or the first radar transmitter and a second (geometrical) end point formed by the second radar receiver, between the first and second end points.

An improved accuracy of object position determination may hence be obtained in a region directly in front of the first radar receiver and the second radar receiver, or the first radar transmitter and the second radar receiver.

The first radar receiver, or the first radar transmitter, and the second radar receiver may be arranged on opposite sides of a central axis extending between a front portion and a rear portion of the mobile robot. This enables a separation between, and thus a difference in aspect angle between, the first radar receiver and the second radar receiver, or the first radar transmitter and the second radar receiver, to be increased.

The central axis here refers to a horizontally oriented axis. The central axis may further extend through a mid-point between outermost side portions of the robot.

The first radar receiver and the second radar receiver may be arranged at different vertical levels. Thereby the ability to detect objects at different levels may be increased. This also enables a difference in aspect angle between the principal axis of the first main transmission lobe and the principal axis of the second main detection lobe to be increased. An improved accuracy in estimating a vertical position of an object is thereby enabled.

Advantageously, the first main transmission lobe and the second main detection lobe may be arranged such that a projection, onto a vertical plane, of a principal axis of the first main transmission lobe and a projection, onto said vertical plane, of a principal axis of the second main detection lobe intersect.

The set of radar nodes may include a first radar node including said first radar transmitter and said first radar receiver, and a second radar node including said second radar receiver. Hence, transmitter and receiver functionality may be combined in a first radar node. A smaller number of radar nodes are hence needed on the mobile robot to achieve the above-discussed advantages.

Correspondingly, the second radar node may include the second radar receiver and a second radar transmitter.

The set of radar nodes may alternatively include a first radar node including said first radar receiver, a second radar node including said second radar receiver and a third radar node including said first radar transmitter. The first, second and third radar node may be arranged at spatially different positions on the mobile robot.

With respect to the second aspect, the first main detection lobe and the second main transmission lobe may be arranged such that a projection, onto a horizontal plane, of a principal axis of the first main detection lobe and a projection, onto said horizontal plane, of a principal axis of the second main transmission lobe intersect.

Alternatively, a projection, onto the horizontal plane, of a principal axis of the first main detection lobe intersects the principal axis of the first main transmission lobe and the principal axis of the second main transmission lobe.

These options enable, separately or in combination, an improved accuracy to be obtained in the region of intersection of the lobes.

Said projections of the principal axes may intersect at a position, along a line extending from a first (geometrical) end point formed by the first radar transmitter or first radar receiver and a second (geometrical) end point formed by the second radar transmitter, between the first and second end points.

An improved accuracy of object position determination may hence be optioned in a region directly in front of the first radar transmitter and the second radar transmitter, or the first radar receiver and the second radar transmitter.

The first radar transmitter, or the first radar receiver, and the second radar transmitter may be arranged on opposite sides of a central axis extending between a front portion and a rear portion of the mobile robot. This enables a separation between, and thus a difference in aspect angle between, the first radar transmitter and the second radar transmitter, or the first radar receiver and the second radar transmitter, to be increased.

The central axis here refers to a horizontally oriented axis. The central axis may further extend through a mid-point between outermost side portions of the robot.

The first radar transmitter and the second radar transmitter may be arranged at different vertical levels. Thereby the ability to detect objects at different levels may be increased. This also enables a difference in aspect angle between the principal axis of the first main transmission lobe and the principal axis of the second main detection lobe to be increased. An improved accuracy in estimating a vertical position of an object is thereby enabled.

Advantageously, the first main detection lobe and the second main transmission lobe may be arranged such that a projection, onto a vertical plane, of a principal axis of the first main detection lobe and a projection, onto said vertical plane, of a principal axis of the second main transmission lobe intersect The set of radar nodes may include a first radar node including said first radar transmitter and said first radar receiver, and a second radar node including said second radar transmitter. Hence, transmitter and receiver functionality may be combined in a first radar node. A smaller number of radar nodes are hence needed on the mobile robot to achieve the above-discussed advantages.

Correspondingly, the second radar node may include the second radar transmitter and a second radar receiver.

Alternatively, the set of radar nodes may include a first radar node including said first radar transmitter, a second radar node including said second radar transmitter and a third radar node including said first radar receiver. The first, second and third radar nodes may be arranged at spatially different positions on the mobile robot.

According to one embodiment the autonomous mobile robot further comprises a radar controller arranged to determine a position of an object within a detection zone defined by said set of radar nodes.

The radar controller may be arranged to, if said object is located in said at least a portion of the intersection, determine a position of said object (in relation to the mobile robot) based on output signals of at least said transmitters and receivers. The position of an object located in a region of overlap of the first and second main detection lobes may be accurately determined based on data fusion from the set of radar nodes.

"Said transmitters and receivers" may here refer to either: the first and second radar receivers and the first radar transmitter; or the first and second radar transmitters and the first radar receiver.

The radar controller may be arranged to, determine a position of said object based on output signals of at least one of said transmitters and receivers received at a first time instant and a second time instant and data representing a movement of the mobile robot.

In particular, the radar controller may be arranged to perform this act if the object is located in in a region covered by only a single radar transmitter or a single radar receiver.

The data representing a movement of the mobile robot may represent a velocity of the mobile robot during a time interval extending between the first and the second time instant.

An autonomous mobile robot, such as an autonomous mobile working apparatus, an autonomous robot cleaner or an autonomous lawn mower, may comprise a wheeled drive system configured to maneuver the mobile robot.

The wheeled drive system may support a body of the robot.

According to a general aspect, there is provided an autonomous mobile robot including a radar, suitable for multistatic radar operation, which radar includes a set of radar nodes, arranged at spatially different positions on the mobile robot, the set of radar nodes including at least two nodes having beam patterns with intersecting main lobes. The system may include at least: two spatially separated radar transmitters having intersecting main transmission lobes and a radar receiver having a main detection lobe intersecting said main transmission lobes. Alternatively, the system may include at least: two spatially separated radar receivers having intersecting main detection lobes and a radar transmitter having a main transmission lobe intersecting said main transmission lobes. Reference is made to the above detailed description, which generally is applicable to this general aspect.

According to a third aspect of the present inventive concept there is provided a motor vehicle comprising:
  a set of radar nodes, said set including:
  at least a first radar transmitter, and
  at least a first and a second radar receiver being arranged at spatially different positions on the mobile robot, the first radar receiver having a first main detection lobe and the second radar receiver having a second main detection lobe intersecting the first main detection lobe, wherein the first radar transmitter has a first main transmission lobe covering at least a portion of an intersection between the first and second main detection lobes.

According to a fourth aspect of the present inventive concept there is provided a motor vehicle comprising:
a set of radar nodes, said set including:
at least a first radar receiver,
at least a first and a second radar transmitter being arranged at spatially different positions on the mobile robot, the first radar transmitter having a first main transmission lobe and the second radar transmitter having a second main transmission lobe intersecting the first main transmission lobe,
wherein the first radar receiver has a first main detection lobe covering at least a portion of an intersection between the first and second main transmission lobes This third and fourth aspect may generally present the same or corresponding advantages as the former first and second aspects, although in the context of motor vehicles. Reference is accordingly made to the above description of advantages and details of the set or radar nodes.

The motor vehicle may be an autonomous motor vehicle. The set of radar nodes may accordingly support an autonomous driving function of the motor vehicle, in particular by enabling detection of objects and determining positions of objects in front or behind the vehicle.

The motor vehicle may be a manually maneuvered vehicle. The set or radar nodes may accordingly support a driver by providing detection of objects and determining positions of objects in front or behind the vehicle. A driver may thus be informed regarding presence of objects.

BRIEF DESCRIPTION OF THE DRAWINGS

The above, as well as additional objects, features and advantages of the present inventive concept, will be better understood through the following illustrative and non-limiting detailed description of preferred embodiments of the present inventive concept, with reference to the appended drawings. In the drawings like reference numerals will be used for like elements unless stated otherwise.

FIG. 5 is a schematic side view of an autonomous mobile robot.

DETAILED DESCRIPTION

In the following, according to a general aspect, an autonomous mobile robot will be described including a radar system, suitable for multistatic radar operation, and including a set of radar nodes, arranged at spatially different positions on the mobile robot, the set of radar nodes including at least two nodes having beam patterns with intersecting main lobes. As may be understood from the following, the system may include at least: two spatially separated radar transmitters having intersecting main transmission lobes and a radar receiver having a main detection lobe intersecting said main transmission lobes. Alternatively, the system may include at least: two spatially separated radar receivers having intersecting main detection lobes and a radar transmitter having a main transmission lobe intersecting said main transmission lobes.

Figure 1:
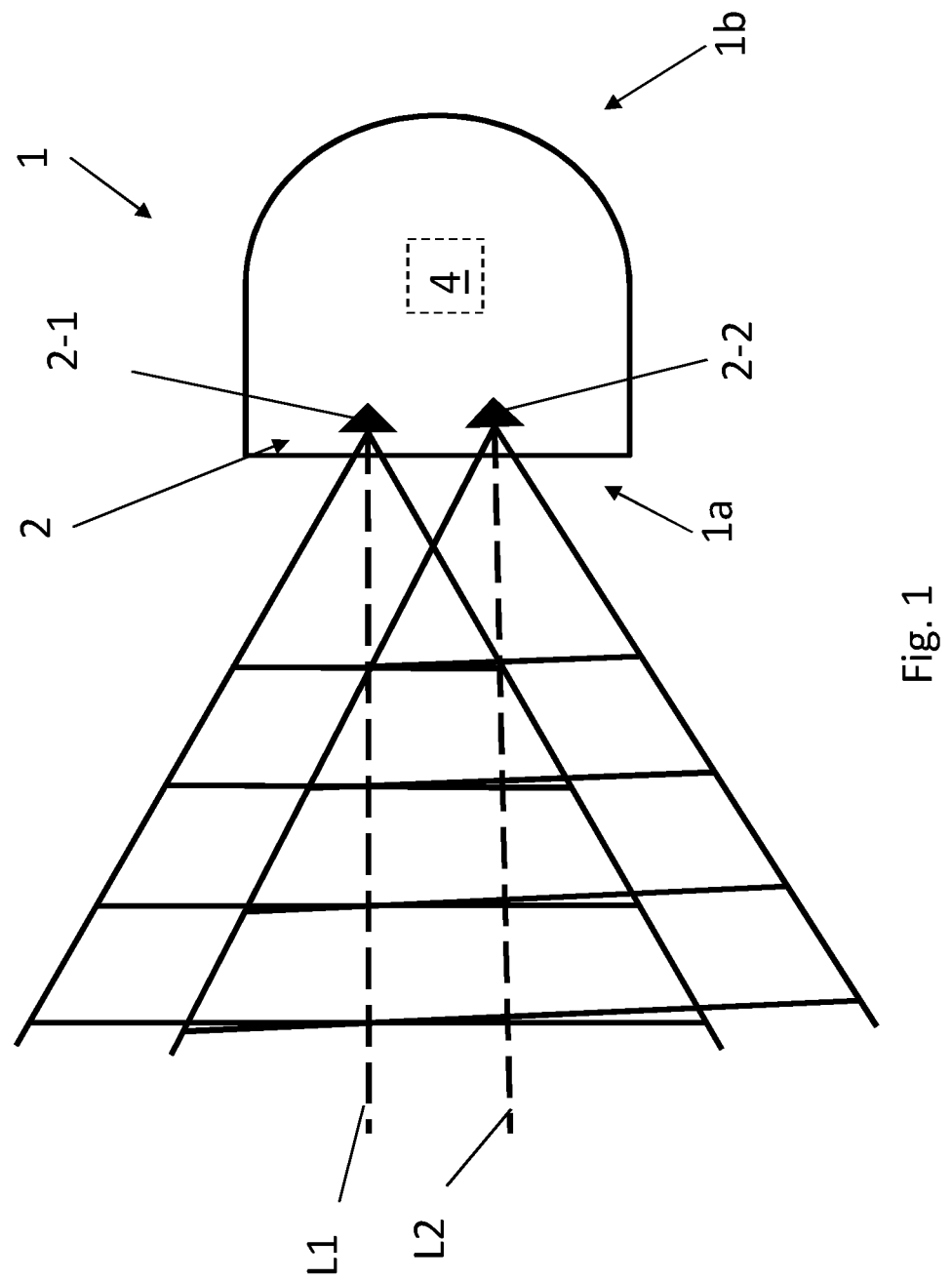
FIG. 1 is a schematic top view of an autonomous mobile robot.

FIG. 1 is a schematic top view of an autonomous mobile robot 1. The mobile robot 1 may be an autonomous mobile working apparatus. The mobile robot 1 may be an autonomous robot cleaner, for instance a vacuum cleaner or sweeping cleaner. The mobile robot 1 may be an autonomous robot lawn mower. It is however noted that the following description may be applied correspondingly to a vehicle.

The mobile robot 1 comprises a wheeled drive system (not shown) configured to maneuver the mobile robot 1. The mobile robot 1 comprises a body, the periphery of which is schematically indicated in FIG. 1. The mobile robot 1 has a front portion 1*a*. The front portion 1*a* corresponds to the portion of the mobile robot 1 leading during a forward movement of the mobile robot 1. The mobile robot 1 further presents a rear portion 1*b*, which is opposite to the front portion 1*a*. The particular shape of the periphery shown in FIG. 1 is merely one example and other shapes are also possible. For instance the shape of the periphery may be circular. Depending on the type of mobile robot the mobile robot may comprise further components enabling the mobile robot to perform the intended function. Autonomous robot cleaners and robot lawn mowers are as such well-known and will therefore not be described in further detail herein.

The mobile robot 1 comprises a set of radar nodes 2. The set of radar nodes 2 includes a first radar node 2-1 and a second radar node 2-2. However, the set of radar nodes may include a plurality of radar nodes arranged at spatially different positions on the mobile robot 1, i.e. spatially distributed on the mobile robot 1. The first radar node 2-1 and the second radar node 2-2 are arranged at the front portion 1*a* of the robot 1.

As shown in FIG. 1, the first radar node 2-1 has a first main detection lobe extending in front of the robot 1 and a second radar node 2-2 having a second main detection lobe extending in front of the robot. The first radar node 2-1 and the second radar node 2-2 are arranged such that the first main detection lobe and the second main detection lobe intersect in front of the mobile robot.

Also indicated in FIG. 1 is a principal axis L1 of the first main detection lobe, projected onto the horizontal plane (which in FIG. 1 is parallel to the viewing plane of FIG. 1). A corresponding projection of a principal axis L2 of the second main detection lobe is also shown.

The first radar node 2-1 includes a first radar transmitter and a first radar receiver. The first radar transmitter and receiver are hence co-located in the first radar node 2-1. The second radar node 2-2 includes a second radar transmitter and a second radar receiver. The second radar transmitter and receiver are hence co-located in the second radar node 2-2. To facilitate understanding, it will in the following be assumed that a transmission beam pattern and a reception beam pattern of each of the first and second radar nodes have completely overlapping, i.e. coinciding, main lobes. Hence, in FIG. 1 the illustrated main detection lobe of a radar node is identical to both the main transmission lobe and the main reception lobe of said radar node. This may be achieved in practice for instance by the radar transmitter and the radar receiver of a radar node using a same antenna. However, the concept is applicable also in configuration where the main transmission lobe and main reception lobe do not coincide.

Thus in the configuration shown in FIG. 1, a first main detection lobe of the first radar node 2-1 and a second main detection lobe of the second radar node 2-2 are intersecting, or overlapping, each other. Moreover, a first main transmission lobe of the first radar node 2-1 covers the intersection between the first and second main detection lobes. Correspondingly, a second transmission lobe of the second radar node 2-2 covers the intersection between the first and second main detection lobes.

An azimuthal angle of each detection lobe may be defined by the angle between the lines along which the detection lobe presents the full width half maximum (FWHM), or half power beam width (HPBW). The angle of the illustrated detection lobes merely represents one example. The azimuthal angle of the detection lobes may for instance be in the range of 50 to 180 degrees. Although not shown, the radar nodes may in practice have additional side lobes.

The first radar node and the second radar node may be radar nodes of a conventional type. The radar nodes may as a first non-limiting example be pulsed radars wherein the first and the second radar node may be arranged to transmit radar signals in the form of pulses or wavelets. The radar nodes may as a second non-limiting example be continuous wave radars wherein the first and second radar nodes may be arranged to transmit frequency modulated continuous wave signals.

The mobile robot 1 includes a radar controller 4. The radar controller 4 acts as a central controller or host for the set of radar nodes 2. The radar controller 4 may communicate with the set of radar nodes 2 via a communication interface. The radar controller 4 may output control signals for controlling the first and second radar nodes. The radar controller 4 may control the radar nodes to transmit and receive radar signals. The radar controller 4 may control the synchronization of transmission of radar signals by the first and the second radar nodes. Radar signals originating from the first and the second radar nodes may be distinguished using conventional techniques such as time-duplexing. The radar controller 4 may receive output signals from the radar nodes indicating inter alia timing of received radar signals. The radar controller 4 may be arranged to determine positions of objects within a detection zone defined by said set of radar nodes 2, based on output signals provided by the radar nodes.

The radar controller 4 may in response to determining radial distance measures from the first and the second radar nodes 2-1, 2-2, due to their different aspect angles, determine the object position. The radar controller 4 may for instance perform data fusion of the output data of the first and second radar nodes 2-1, 2-2. The radar controller 4 may implement techniques, which per se are well-known, for determining positions of objects in the detection zone, in particular within overlapping region. Non-limiting examples of techniques which may be implemented by the radar controller 4 include Simultaneous localization and mapping (SLAM), Kalman filtering and Extended Kalman filtering (EKF). In case the set of radar nodes includes more than two radar nodes, trilateration techniques may also be used.

The mobile robot 1 may include (not shown) auxiliary sensors such as accelerometers and/or gyros. Output signals from such auxiliary sensors may be included in the data fusion and used for the purpose of object position determination.

The radar controller 4 may output data including information on positions of objects in the detection zone of the set of radar nodes 2 to a maneuvering controller of the mobile robot. The maneuvering controller may thereby determine whether objects represent obstacles in the current movement path of the mobile robot 1 and, for instance, adapt the movement path to avoid the obstacle. Algorithms used for controlling the movement of the mobile robot may be of a conventional type, which per se are known to the skilled person.

Although in the above, both the first radar node 2-1 and the second radar node 2-2 includes a radar transmitter and receiver, other configurations are also possible. For instance the first radar node 2-1 may include both a transmitter and a receiver while the second radar node 2-2 includes only a receiver or a transmitter. Hence, a two-transmitters-one-receiver configuration as well as a one-transmitter-two-receiver configuration are equally possible alternatives in a two radar node setup.

Figure 2:
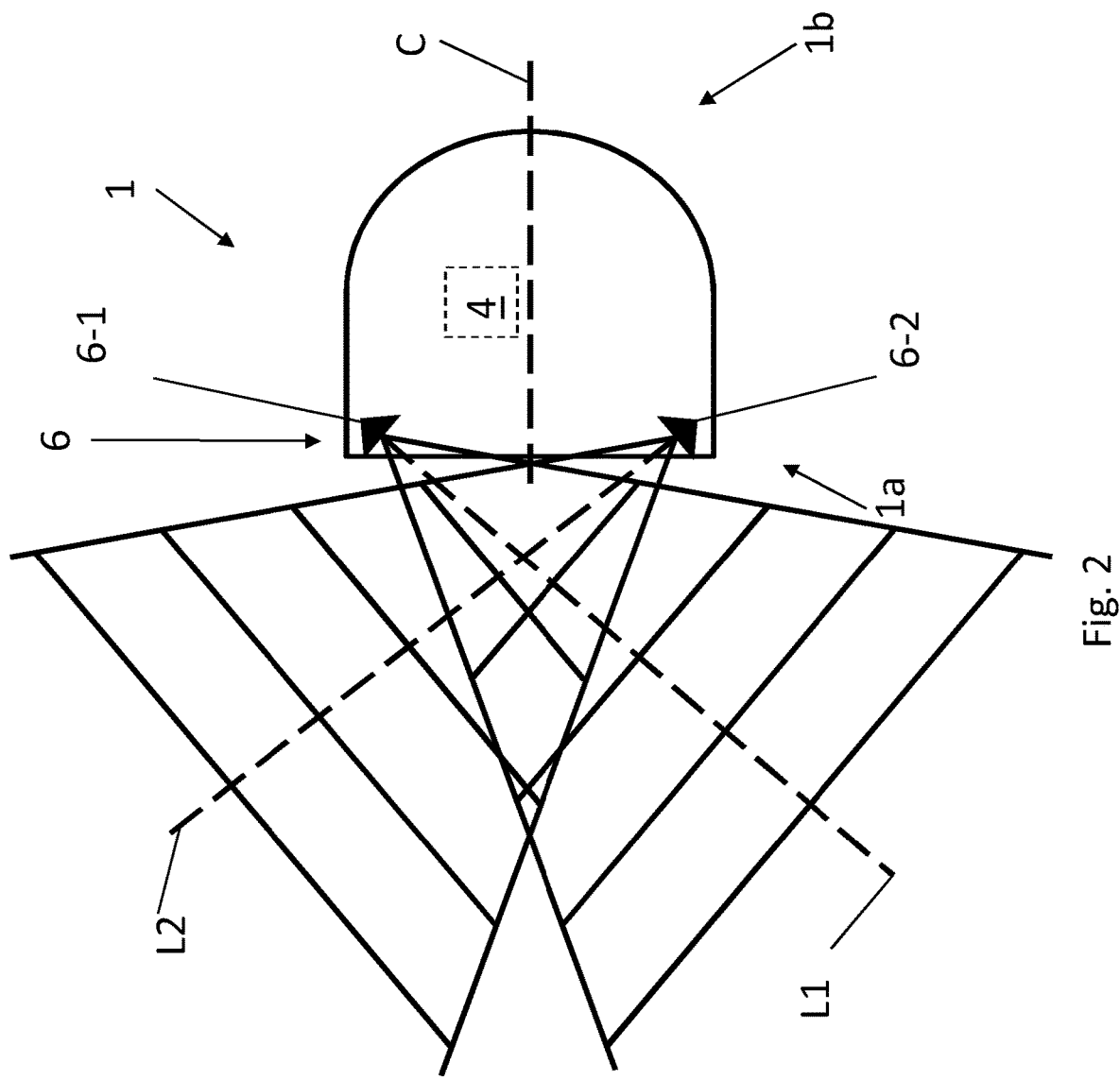
FIG. 2 is a schematic top view of an autonomous mobile robot.

FIG. 2 illustrates a mobile robot 1, similar to the mobile robot of FIG. 1, however comprising a set of radar nodes 6 arranged in a different manner.

The set of radar nodes 6 include a first radar node 6-1 and a second radar node 6-2, corresponding to the first radar node 2-1 and the second radar node 2-2 of FIG. 1. In contrast thereto, the first radar node 6-1 and the second radar node 6-2 are arranged such that a projection, onto a horizontal plane, of a principal axis L1 of the first main detection lobe and a projection, onto said horizontal plane, of a principal axis L2 of the second main detection lobe intersect in front of the robot 1. As FIG. 2 is a top-view, the viewing plane in FIG. 2 is parallel to the horizontal plane.

Assuming, similar to FIG. 1, overlapping main transmission and detection lobes for the first and second radar nodes 6-1, 6-2, if follows that also the horizontal plane projections of the principal axes of the first main transmission lobe of the first radar node 6-1 and the second main detection lobe of the second radar node 6-2, respectively, intersect. Correspondingly, the horizontal plane projections of the principal axes of the second main transmission lobe of the second radar node 6-2 and the first main detection lobe of the first radar node 6-1, respectively, intersect.

The projections of the respective principal axes L1, L2 of the first and second main detection lobes intersect at a position, along a geometrical line extending between the first and the second node, between the first and the second node.

The first radar node 6-1 and the second radar node 6-2 are arranged on opposite sides of a central axis C extending between a front portion 1a and a rear portion 1b of the robot 1. The principal axis L1 and L2 are hence rotated inwardly, towards a central axis C extending between the front.

The first and second radar nodes are arranged at opposite outer corner portions of the body of the mobile robot 1. The difference in aspect angles may thereby be increased.

The positions of objects located in the overlapping region of the first and second main detection lobes may be determined using the techniques discussed in connection with FIG. 1. As an illustrative example: Assume the two radar nodes in FIG. 2 are separated by 0.3 meters and the target is located 0.15 meters in the direct front of the robot. Assume further that the range estimate error has a standard deviation $\sigma_R$ of 0.01 meters. Due to the geometry, the slant-range uncertainty, $r_S$, and the cross-range uncertainty, $r_C$, become $r_S=r_C=\sigma_R=0.01$ meters. The cross-range uncertainty in this case is smaller than the cross-range uncertainty achievable by radar node placement in FIG. 1.

If an object is located in a region covered by only the first or second detection lobe, the radar controller 4 may determine a position of the object based on output signals of the first or second radar node received at a first time instant and a second time instant and data representing a movement of the mobile robot.

Figure 3:
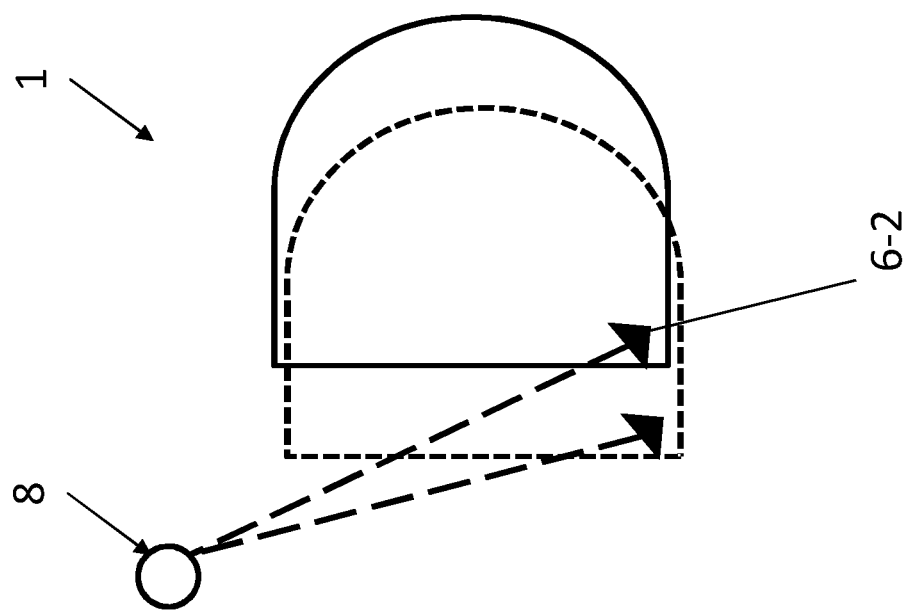
FIG. 3 is a schematic illustration of an object located within a lobe of a radar receiver at two time instants.

FIG. 3 shows the movement of the mobile robot 1 between the first time instant and the second time instant. Due to the difference in aspect angle to the object 8 with respect to the same radar node 6-1 at the two positions, trilateration using the distance measures at the first and second time instant enables determination of the position of the object. The separation between the first and second time instant may be on the order of a one or a few tenths of a second. Velocity data may be included in the data fusion with the output signals from the radar nodes 6-1, 6-2. The radar controller 4 may be provided with velocity data by the maneuver controller of the mobile robot 1 or by optional auxiliary sensors such as accelerometers or gyroscopes. For instance, the velocity data may indicate an average velocity during time interval between the first and second time instants.

Figure 4:
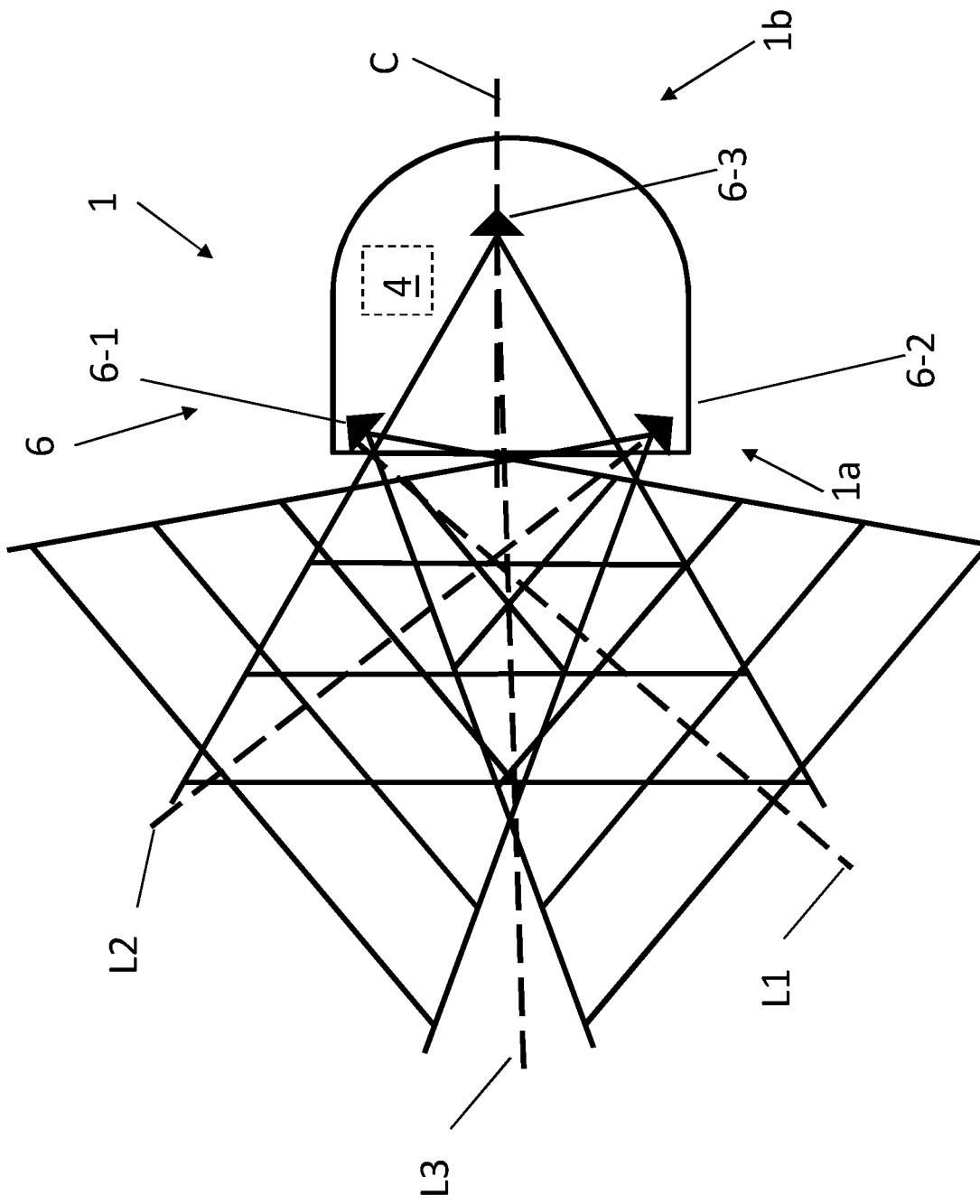
FIG. 4 is a schematic top view of an autonomous mobile robot.

FIG. 4 illustrates a mobile robot 1, similar to the mobile robot of FIG. 2, however comprising a set of radar nodes 8 including a further, third radar node 6-3. In the following it will be assumed that the third radar node 6-3 includes both a radar transmitter and a radar receiver. However, it is also possible to provide a third radar node 6-3 including only a radar transmitter or only a radar receiver.

With reference to FIG. 4, the third radar node 6-3 has a third main detection lobe extending in front of the robot 1. The third radar node is arranged such that the third main detection lobe intersects said first and second main detection lobes. The third radar node is arranged such that a projection, onto said horizontal plane, of a principal axis L3 of the third main detection lobe intersect said principal axes projections of the first and second main detection lobes L1, L2.

The first and second radar nodes 6-1, 6-2 are arranged closer to a front portion 1a of the mobile robot 1 than the third radar node 6-3.

The third radar node further improves the accuracy of the determination of positions of objects. The total amount of area in front of the mobile robot 1, where detection lobes are overlapping is greater than in FIG. 2. Moreover, just in front of the mobile robot 1, the number of overlapping detection lobes is increased compared to FIG. 2. An object position may hence be determined based on output signals of the first, second and third radar node.

As shown in the side-view of FIG. 5 the first and second radar nodes 6-1, 6-2 may be arranged on a lower portion of the mobile robot 1 and the third radar node 6-3 may be arranged on an upper portion of the mobile robot. Hence, the third radar node 6-3 is arranged at a different vertical level than the first and second radar nodes 6-1, 6-2.

The principal axis L3 may as shown extend in a downward direction. The principal axes L1, L2 may extend in parallel to the horizontal plane.

As shown, the detection/transmission lobe of the second radar node 6-2 and the main detection/transmission lobe of the third radar node 6-3 are arranged such that the projection, onto a vertical plane (parallel to the viewing plane in FIG. 5), of the principal axis L2 of the main detection/transmission lobe of the second radar node 6-2 and the projection, onto said vertical plane, of the principal axis L3 of the main detection/transmission lobe intersect.

Placing the three nodes according to FIG. 5, makes it possible to determine an altitude or level of an elevated object. In the example of FIG. 5 an object is arranged with a clearance with respect to the surface on with the mobile robot 1 is moving. The comparably broad main lobes makes it more likely that the lower edge of the object is covered by the lobes of at least two nodes with different aspect angles to the cavity border. Therefore, the altitude of the lower edge can be determined using any of the above-described techniques. The benefit of having the option to tilt the nodes, here in elevation, due to the broad lobes while preserving high angular coverage, detecting obstacles both looking up, looking forward and looking down is possible as shown in FIG. 5. Combining nodes with different tilt and separated in height will improve the ability to detect objects with different geometrical features which are laying on the floor.

In the above the inventive concept has mainly been described with reference to a limited number of examples. However, as is readily appreciated by a person skilled in the art, other examples than the ones disclosed above are equally possible within the scope of the inventive concept, as defined by the appended claims.

For instance, in the configuration shown in FIG. 2 the first radar node 6-1 may include both a radar transmitter and a radar receiver while the second radar node 6-2 may include only a radar transmitter or only a radar receiver. The first radar node 6-1 and the second radar node 6-2 may additionally be arranged at different levels. For instance, the first radar node 6-1 may instead be arranged at a position corresponding to the position of the third radar node 6-3 shown in FIGS. 4 and 5 and the second radar node 6-2 may be arranged at a position corresponding to the position of the first or second radar node 6-1, 6-2 shown in FIGS. 4 and 5.

Moreover, the radar nodes need not be arranged with transmission/detection lobes oriented in a front direction. Alternatively radar nodes may be arranged with transmission/detection lobes in a rearward direction or a front direction.

The invention claimed is:

1. An autonomous mobile robot comprising:
a set of radar nodes, said set comprising:
a first radar transmitter; and
a first radar receiver and a second radar receiver being arranged at spatially different positions on the autonomous mobile robot, the first radar receiver having a first main detection lobe and the second radar receiver having a second main detection lobe intersecting the first main detection lobe,
wherein the first radar transmitter has a first main transmission lobe covering at least a portion of an intersection between the first and second main detection lobes,
wherein the first main detection lobe and the second main detection lobe are arranged such that a projection, onto a horizontal plane, of a principal axis of the first main detection lobe and a projection, onto said horizontal plane, of a principal axis of the second main detection lobe intersect, and
wherein said projections of the principal axes intersect at a position, along a line extending from a first end point formed by the first radar receiver or the first radar transmitter and a second end point formed by the second radar receiver, between the first and second end points.

2. The autonomous mobile robot of claim 1, wherein the first main transmission lobe and the second main detection lobe are arranged such that a projection, onto a horizontal plane, of a principal axis of the first main transmission lobe and a projection, onto said horizontal plane, of a principal axis of the second main detection lobe intersect.

3. The autonomous mobile robot of claim 1, wherein a projection, onto the horizontal plane, of a principal axis of the first main transmission lobe intersects the principal axis of the first main detection lobe and the principal axis of the second main detection lobe.

4. The autonomous mobile robot of claim 1, wherein the first radar receiver, or the first radar transmitter, and the second radar receiver are arranged on opposite sides of a central axis extending between a front portion and a rear portion of the mobile robot.

5. The autonomous mobile robot of claim 1, wherein the first radar receiver and the second radar receiver are arranged at different vertical levels.

6. The autonomous mobile robot of claim 5, wherein the first main detection lobe and the second main detection lobe are arranged such that a projection, onto a vertical plane, of a principal axis of the first main detection lobe and a projection, onto said vertical plane, of a principal axis of the second main detection lobe intersect.

7. The autonomous mobile robot of claim 1, wherein the set of radar nodes includes a first radar node including said first radar transmitter and said first radar receiver, and a second radar node including said second radar receiver.

8. The autonomous mobile robot of claim 1, wherein the set of radar nodes includes a first radar node including said first radar receiver, a second radar node including said second radar receiver and a third radar node including said first radar transmitter, the first, second and third radar nodes being arranged at spatially different positions on the mobile robot.

9. The autonomous mobile robot of claim 1, further comprising a radar controller arranged to detect an object within a detection zone defined by said set of radar nodes.

10. The autonomous mobile robot of claim 9, wherein the radar controller is arranged to, if said object is located in said at least a portion of the intersection, determine a position of said object based on output signals of at least said transmitter and receivers.

11. The autonomous mobile robot of claim 9, wherein the radar controller is arranged to determine a position of said object based on output signals of at least one of said transmitter and receivers received at a first time instant and a second time instant and data representing a movement of the mobile robot.

12. The autonomous mobile robot of claim 1, wherein the autonomous mobile robot is an autonomous robot cleaner or an autonomous robot lawn mower.

13. An autonomous mobile robot comprising:
a set of radar nodes, said set comprising:
    a first radar receiver; and
    a first radar transmitter and a second radar transmitter being arranged at spatially different positions on the autonomous mobile robot, the first radar transmitter having a first main transmission lobe and the second radar transmitter having a second main transmission lobe intersecting the first main transmission lobe,
wherein the first radar receiver has a first main detection lobe covering at least a portion of an intersection between the first and second main transmission lobes,
wherein the first main transmission lobe and the second main transmission lobe are arranged such that a projection, onto a horizontal plane, of a principal axis of the first main transmission lobe and a projection, onto said horizontal plane, of a principal axis of the second main transmission lobe intersect, and
wherein said projections of the principal axes intersect at a position, along a line extending from a first end point formed by the first radar transmitter or first radar receiver and a second end point formed by the second radar transmitter, between the first and second end points.

14. The autonomous mobile robot of claim 13, wherein the first main detection lobe and the second main transmission lobe are arranged such that a projection, onto a horizontal plane, of a principal axis of the first main detection lobe and a projection, onto said horizontal plane, of a principal axis of the second main transmission lobe intersect.

15. The autonomous mobile robot of claim 13, wherein a projection, onto the horizontal plane, of a principal axis of the first main detection lobe intersects the principal axis of the first main transmission lobe and the principal axis of the second main transmission lobe.

16. The autonomous mobile robot of claim 13, wherein the first radar transmitter, or the first radar receiver, and the second radar transmitter are arranged on opposite sides of a central axis extending between a front portion and a rear portion of the mobile robot.

17. The autonomous mobile robot of claim 13, wherein the first radar transmitter and the second radar transmitter are arranged at different vertical levels.

18. The autonomous mobile robot of claim 17, wherein the first main transmission lobe and the second main transmission lobe are arranged such that a projection, onto a vertical plane, of a principal axis of the first main transmission lobe and a projection, onto said vertical plane, of a principal axis of the second main transmission lobe intersect.

19. The autonomous mobile robot of claim 13, wherein the set of radar nodes includes a first radar node including said first radar transmitter and said first radar receiver, and a second radar node including said second radar transmitter.

20. The autonomous mobile robot of claim 13, wherein the set of radar nodes includes a first radar node including said first radar transmitter, a second radar node including said second radar transmitter and a third radar node including said first radar receiver, the first, second and third radar nodes being arranged at spatially different positions on the mobile robot.

21. The autonomous mobile robot of claim 13, wherein the autonomous mobile robot is an autonomous robot cleaner or an autonomous robot lawn mower.

22. An autonomous mobile robot, comprising:
a set of radar nodes, said set comprising:
    a first radar transmitter; and
    a first radar receiver and a second radar receiver being arranged at spatially different positions on the autonomous mobile robot, the first radar receiver having a first main detection lobe and the second radar receiver having a second main detection lobe intersecting the first main detection lobe,
wherein the first radar transmitter has a first main transmission lobe covering at least a portion of an intersection between the first and second main detection lobes,
wherein the first main detection lobe and the second main detection lobe are arranged such that a projection, onto a horizontal plane, of a principal axis of the first main detection lobe and a projection, onto said horizontal plane, of a principal axis of the second main detection lobe intersect, and
wherein the first radar receiver and the second radar receiver are arranged at different vertical levels.

* * * * *